Nov. 2, 1948.  W. W. REMY  2,452,682
REFLECTOR DRIFT INDICATOR APPARATUS
FOR BOATS AND AIRCRAFT
Filed March 23, 1945
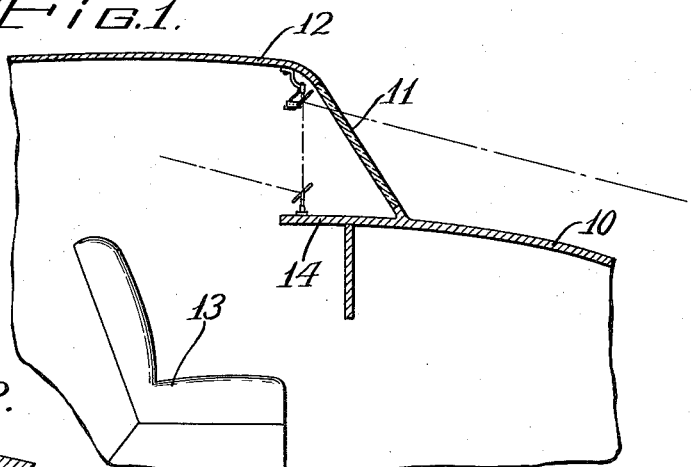
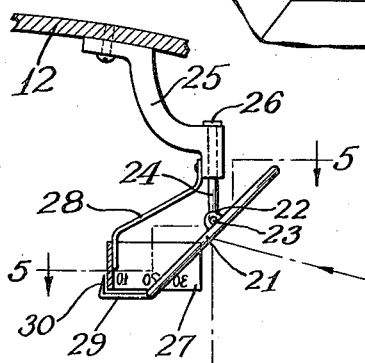
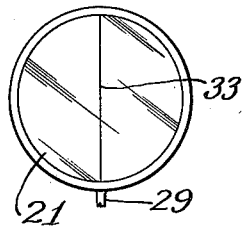
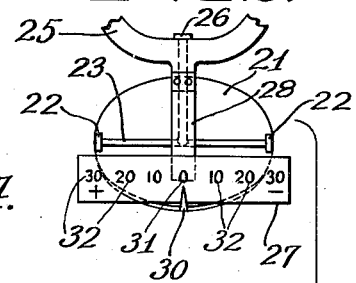
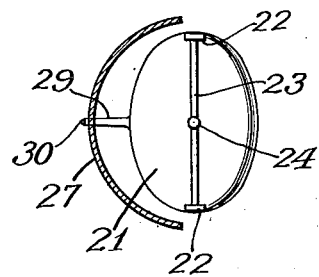
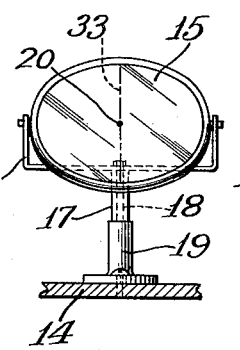
Inventor:
Walter W. Remy
By Kent W. Wonnell
Attorney Patented Nov. 2, 1948

2,452,682

UNITED STATES PATENT OFFICE 2,452,682

REFLECTOR DRIFT INDICATOR APPARATUS FOR BOATS AND AIRCRAFT

Walter W. Remy, Angola, Ind.

Application March 23, 1945, Serial No. 584,426

3 Claims. (Cl. 88—1)

1

This invention relates in general to a device for measuring the drift angle of a boat, aircraft, or other conveyance, movable on or in a fluid medium.

A further object of the invention is to provide a drift measuring device for an aeroplane by providing an objective mirror which may be adjusted to the angle of drift.

Still a further object of the invention is to provide an eyepiece for observing a movable objective so that the angle of drift may be observed by two pilots or from any position along the pilot seat.

A further object of the invention is to provide an adjustable eye piece mirror for use by different pilots along the same seat or for pilots of different height in the same seat.

Still a further object of the invention is to provide a simple, inexpensive and easily operated drift indicator which requires no complicated structure or setting, but is easily positioned and set for following the angle of drift and for observing the amount of the angle.

Other objects of the invention will appear in the specification and will be apparent from the accompanying drawings in which:

Fig. 1 is a view illustrating the invention as applied to an aircraft cabin with an objective mirror mounted at the top of a front observation window and an eye piece mirror located below it and in front of the driver's position;

Fig. 2 is an enlarged side elevation of the objective and eye piece mirrors as shown in Fig. 1;

Fig. 3 is an elevational view of the drift measuring device as it would be seen by an observer;

Fig. 4 is a view of the face of the objective mirror having a vertical appearing drift line; and Fig. 5 is a sectional view of the objective mirror as taken on the line 5—5 of Fig. 1.

In operating an aeroplane, it may happen that the pilot is unable to look over the front portion of the body or fuselage of the plane to observe a distant fixed object, particularly if it were located upon the ground or below the aircraft. For this reason an objective mirror is located at the top of a front sight window where the forward direction of movement of the aeroplane may be observed To more easily understand this device, a modified periscope of the type mounting mirrors in a hollow tube should be considered. If such a periscope had a line on the objective mirror, it would be possible to tell with a considerable degree of accuracy whether the observer is moving directly toward a fixed object and whether the path

2 varied from this line. It is assumed that the line is so positioned on the mirror as to appear vertical.

If that portion of the periscope tube carrying the objective mirror is made rotatable with respect to the rest of the periscope, then an object at an oblique position would appear to be approached directly by the observer from the front of the aeroplane. Thus if a scale of distance is mounted in such a manner that the amount of rotation of the objective end of the periscope could be measured, then the amount that the object approached differed in its path from that in line with the longitudinal axis of the aeroplane is measured by rotating the objective mirror so that the aeroplane appeared to be moving directly along the line on the mirror, and by then reading the scale indication.

In this device, an actual periscope tube would interfere with the visibility for the normal operation of the aircraft. The mirrors are therefore supported by the structure of the aircraft and then the periscope tube is omitted. The objective mirror is mounted in the top of the cabin close to the front window or windshield so that it gives a view of the ground over the nose of the aircraft and reasonably close thereto.

Referring now more particularly to the drawings, an aircraft type of cabin is represented as having a forwardly projecting nose 10 with a front inclined window 11 extending to the top 12 of the cabin and with a pilot seat 13 suitably located within the cabin and adjacent the window.

Suitably mounted upon a ledge 14 or another suitable support in front of the pilot seat and at the bottom of the window is an eye piece mirror 15. Pivotally mounted at the sides in a frame 16 to swing about a horizontal axis and the frame having a hollow stem 17 mounted to turn upon a vertical axis about a rod 18 projecting upwardly from a bracket 19 secured to the supporting ledge 14. This mirror 15 may thus be swung about axes at right angles to each other to adjust it for one or more observers seated along the seat 13 and for varying the inclination of the mirror to obtain the best view of an objective mirror. At the center of the eye piece mirror is a locating dot or point 20 for more accurately setting it with respect to an objective mirror.

At the top of the cabin and close to the window is an objective mirror 21 mounted to swing upon a horizontal axis for adjusting the tilting movement of the mirror, a suitable mounting comprising a pair of ears 22 projecting rearwardly from the face of the mirror for receiving a transverse pivoting bar 23. This bar has a central stem 24 to project in a vertical direction and extending through a suitable bore in a bracket 25 attached to the top of the cabin 12 and projecting downwardly therefrom, the top of the stem having a head 26 for seating and holding it in the bracket and permitting the swinging of the mirror about the stem as a vertical axis.

Also supported by the upper bracket 25 is a curved plate 27 having a support 28 secured thereto and to the lower end of the bracket 25 for holding the plate in fixed position at the rear of the objective mirror and adjacent the lower edge thereof. Projecting from the lower edge of the mirror is an arm 29 having an upwardly extending pointer 30 at its extremity, the pointer being normally located at the rear side of the plate 27 relative to the mirror so that the position of the pointer is easily noted by an observer in the pilot seat. In the outer face of the plate is a central or zero point 31 with angle graduations and numerals 32 on opposite sides of the zero point marked with plus and minus signs so that there can be no doubt in the mind of the user whether to add or subtract the drift angle to obtain the true course.

On the face of the objective mirror is a vertical line 33 which will appear in the eye piece mirror and the latter adjusted so that the mark or dot 20 may be made to register with the reflected vertical line 33 depending upon the angular position of the objective mirror.

In operation, and assuming that the aircraft is drifting to the right, the amount of the drift may be determined by manually adjusting the position of the objective mirror 21 as viewed through the eye piece mirror 15 into such a position that a distant object will appear to be moving directly on or along the vertical line 33 of the objective mirror when that line appears in the eye piece mirror as registering with the marking dot or point 20. With the mirror in this position, the pointer 30 will be swung in the opposite direction, that is, toward the left with respect to the angle marked plate 27 and the drift angle may be read directly therefrom by the observer from the rear of the objective mirror and the plate 27. If the plate 27 is similarly graduated at the inside as well as on the outer side, the angle of drift may be observed directly in the eye piece glass 15.

Since the accuracy of the result of this type of device is dependent upon the position of the eye piece mirror and not upon the position of the observer, it follows that the observer may occupy either seat of the aircraft which is equipped with controls, by simply adjusting the angle of the eye piece mirror to get the proper view of the objective mirror.

This periscope-like arrangement may be reversed with the objective mirror disposed below the bottom of the fuselage, the eye piece mirror then being mounted below the support 14 to reflect the line of vision up to the occupant of the pilot seat.

It is obvious that other changes may be made in the construction, combination and arrangement of the parts without departing from the spirit and scope of the invention.

I claim:

1. A drift indicator for a pilot of aircraft, boats, and the like, comprising upper front view objective mirror having means mounting it for swinging movement on a horizontal axis and upon a vertical axis, a transverse drift indicating line on the mirror parallel to the vertical axis, an eye piece mirror spaced from the objective mirror having means mounting it for movement about a vertical axis and a horizontal axis, and the face of the eye piece mirror having a central marked dot for locating the reflection of the drift indicating line of the objective mirror with respect thereto.

2. A drift measuring apparatus, comprising an objective mirror having means mounting it for swinging movement about a horizontal axis and about a vertical axis at the top of a window, a drift indicating line on the mirror parallel to the vertical axis, a curved plate stationarily mounted adjacent the bottom of the mirror with angle graduations thereon at both sides of a central position and on both sides of the plate, a pointer extending from the lower edge of the mirror adjacent the plate and close to the angle graduations, an eye piece mirror spaced below the objective mirror having means mounting it for movement about a vertical axis and about a horizontal axis and the face of the eye piece having a central mark for locating the reflection of the drift indicating line of the objective mirror with respect to the mark depending upon the direction which the objective mirror is turned about its vertical axis.

3. A drift indicator for a pilot of aircraft, boats, and the like, comprising a front view objective mirror having means for mounting it at the top of the pilot's window for swinging movement about a horizontal axis and about a vertical axis, an eye piece mirror spaced below the objective mirror having means mounting it for movement about a horizontal axis and about a vertical axis at the lower side of the window leaving the pilot's line of vision through the window unobstructed by said mirrors, the objective mirror having a vertical line and the eye piece mirror having a central mark whereby the pilot may manually adjust the mirror, one at the angle of drift and the other to locate the said vertical line and the point in line with a distant object on the line of drift for observation through said mirrors of the path of relative movement by the pilot.

WALTER W. REMY.

REFERENCES CITED

The following references are of record in the file of this patent:

UNITED STATES PATENTS

| Number | Name | Date |
|---|---|---|
| 187,432 | Totten | Feb. 13, 1877 |
| 527,640 | Wetherill | Oct. 16, 1894 |
| 873,228 | Hahn | Dec. 10, 1907 |
| 1,188,844 | Schurmann | June 27, 1916 |
| 1,311,277 | Head | July 29, 1919 |
| 1,551,182 | Venetta | Aug. 25, 1925 |
| 1,783,769 | Bates | Dec. 2, 1930 |
| 1,977,762 | Gatty | Oct. 23, 1934 |
| 2,359,994 | Klemperer | Oct. 10, 1944 |
| 2,374,956 | Rubissow | May 1, 1945 |

FOREIGN PATENTS

| Number | Country | Date |
|---|---|---|
| 18,529 | Great Britain | 1893 |